(12) United States Patent
Gillis et al.

(10) Patent No.: US 6,618,221 B2
(45) Date of Patent: Sep. 9, 2003

(54) SYSTEM AND METHOD FOR UTILIZING AN ACTUATOR-ACTIVATED PUMPING MECHANISM FOR REDUCING THE OPERATING PRESSURE OF A DISK DRIVE ASSEMBLY

(75) Inventors: Donald Ray Gillis, San Jose, CA (US); Kris Victor Schouterden, Los Gatos, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/850,653

(22) Filed: May 7, 2001

(65) Prior Publication Data
US 2002/0163755 A1 Nov. 7, 2002

(51) Int. Cl.⁷ .......................... G11B 33/14; G11B 19/02
(52) U.S. Cl. .................. 360/97.02; 360/137; 360/69
(58) Field of Search ............... 360/97.02, 97.03, 360/97.01, 69, 137

(56) References Cited

U.S. PATENT DOCUMENTS

| 3,590,222 A | * | 6/1971 | Wentzel et al. |
| 4,585,397 A | | 4/1986 | Crawford et al. |
| 5,454,157 A | | 10/1995 | Ananth et al. |
| 6,144,178 A | | 11/2000 | Hirano et al. |

FOREIGN PATENT DOCUMENTS

| JP | 61115291 | | 6/1986 |
| JP | 63117378 | | 5/1988 |
| JP | 2267783 | | 11/1990 |
| JP | 5-258552 | | 10/1993 |
| JP | 2000-268530 | * | 9/2000 |

OTHER PUBLICATIONS

"Airflow System For Disk Drive, " IBM Technical Disclosure Bulletin, vol. 29, No. 3, Aug. 1986.

* cited by examiner

*Primary Examiner*—Craig A. Renner
(74) *Attorney, Agent, or Firm*—Robert B. Martin; Bracewell & Patterson, L.L.P.

(57) ABSTRACT

A disk drive having an actuator-activated pumping mechanism is disclosed. The pumping mechanism creates a low pressure operating environment for the disk drive in order to enhance the performance of the drive at higher rotational operating speeds. Through the use of an engaging element, the actuator motor acts to drive a pumping element. This design does not use a separate electrical motor to evacuate the disk drive housing. Instead, the natural motion of the actuator provides the necessary power to drive the pumping element.

15 Claims, 1 Drawing Sheet

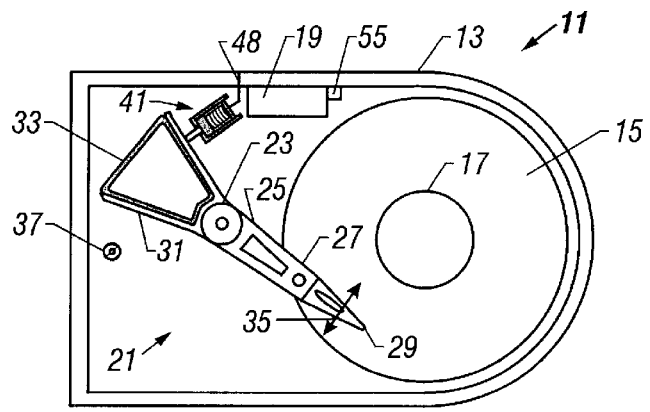
FIG. 1
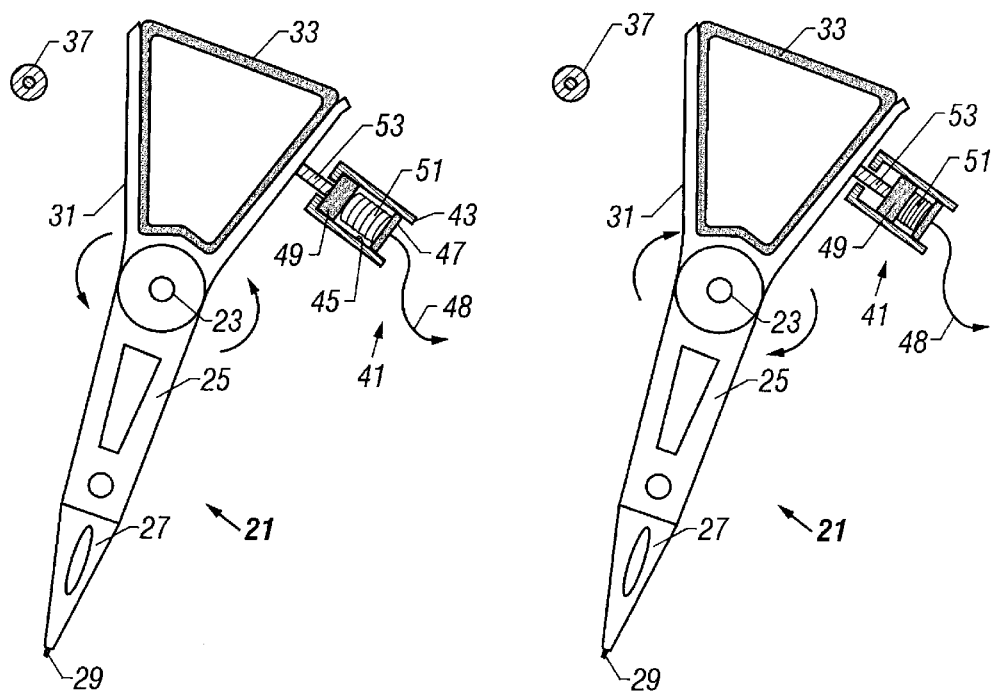
FIG. 2          FIG. 3

SYSTEM AND METHOD FOR UTILIZING AN ACTUATOR-ACTIVATED PUMPING MECHANISM FOR REDUCING THE OPERATING PRESSURE OF A DISK DRIVE ASSEMBLY

BACKGROUND OF THE INVENTION

1. Technical Field

This invention relates in general to data access and storage devices, and in particular to disk drives. Still more particularly, the present invention relates to a system and method of activating a pumping system in a disk drive with the actuator.

2. Description of the Related Art

Disk drives, also called disk files, are information storage devices that use a rotatable disk with concentric data tracks containing the information, a head or transducer for reading and/or writing data onto the various tracks, and an actuator connected to a carrier for the head for moving the head to the desired track and maintaining it over the track centerline during read and write operations. The most common form of actuator is a rotary voice coil motor (VCM) actuator that moves the head carrier in a nonlinear, generally arcuate path across the disk. There are typically a number of disks mounted on a hub that is rotated by a disk drive motor, also called a spindle motor, and a number of head carriers connected to the actuator for accessing the surfaces of the disks. A housing supports the drive motor and head actuator, and surrounds the heads and disks to provide a substantially sealed environment. In conventional magnetic recording disk drives, the head carrier is an air-bearing slider that has an air-bearing surface (ABS) designed to enable the slider to "fly" or ride on a bearing of air above the disk surface when the disk is rotating at its operating speed. The slider is maintained next to the disk surface by a biasing force from a suspension that connects the slider to the actuator. The suspension is attached to a rigid arm connected to the actuator.

Contact start/stop (CSS) disk drives operate with the slider in contact with the disk surface during start and stop operation when there is insufficient disk rotational speed to maintain the air bearing. To minimize the effect of "stiction", i.e., the static friction and adhesion forces between the very smooth disk surface and the slider, CSS disk drives often use a dedicated "landing zone" where the slider is parked when the drive is not operating. The landing zone is typically a specially textured, non-data region of the disk.

In contrast to CSS disk drives, "load/unload" disk drives address the stiction problem by mechanically unloading the slider from the disk when the power is turned off, and then loading the slider back to the disk when the disk has reached a speed sufficient to generate the air bearing. The loading and unloading is typically done by means of a ramp that contacts the suspension when the actuator is moved away from the data region of the disk. The slider is thus parked off the disk surface with the suspension supported in a recess of the ramp. Load/unload disk drives are more commonly used in laptop and notebook computers because the parking of the slider on the ramp away from the disk surface also provides some resistance to external shocks caused by moving or dropping the computer.

To improve the performance of disk drives, particularly the rate at which the recorded data can be accessed, it is desirable to rotate the disk at high rotational velocities. In addition, it is desirable to place the data tracks as close together as possible to maximize the data storage capacity. However, when conventional disk drives, such as commercially available 3.5 inch and 2.5 inch form factor drives, are rotated at high rotational velocities they consume excessive power and generate excessive heat in the disk drive housing. In addition, high speed disk rotation causes airflow-induced disk "flutter" and vibration of the suspension and/or arm, which makes it difficult for the read/write head to locate the proper data track. This is referred to as track misregistration (TMR).

The use of a hermetically sealed disk drive housing containing a gas other that air, such as helium, to reduce the effect of heat generation within the housing has been proposed, as described in U.S. Pat. No. 4,367,503 and Japanese published patent application JP8077527A. IBM Technical Disclosure Bulletin, Vol. 23, No. 9 (February 1981), describes a removable disk pack mounted on a drive apparatus that uses reduced air pressure around the rotating disks to reduce the effects of heat generation and air turbulence. Japanese published patent application JP7021752A describes a test apparatus that uses a vacuum pump to remove air from within the test chamber for the purpose of testing the head carrier-disk interface. Japanese published patent application JP 10222960A describes an optical CD-ROM drive with a vacuum pump for removing air to decrease air resistance and eliminate dust particles.

In another prior art example, U.S. Pat. No. 6,144,178, a system for reducing the operational pressure inside a disk drive assembly is disclosed. However, this design requires a dedicated electrical motor, which implies the use of expensive additional parts in the disk drive. Moreover, the motor size or volume is severely constrained, which in turn constrains the amount of energy that can be safely dissipated. Consequently, the pumping rate is relatively slow. Thus, an improved system and method for reducing the operational pressure inside a disk drive assembly at high rotational velocities without consuming excessive power and without generating disk flutter or vibration of the suspension or arm would be desirable.

SUMMARY OF THE INVENTION

In one embodiment of the present invention, a disk drive having an actuator-activated pumping mechanism is disclosed. The pumping mechanism creates a low pressure operating environment for the disk drive in order to enhance the performance of the drive. Through the use of an engaging element, the actuator motor acts to drive a pumping element. This design does not use a separate electrical motor to evacuate the disk drive housing. Instead, the natural motion of the actuator provides the necessary power to drive the pumping element.

The foregoing and other objects and advantages of the present invention will be apparent to those skilled in the art, in view of the following detailed description of the preferred embodiment of the present invention, taken in conjunction with the appended claims and the accompanying drawings.

BRIEF DESCRIPTION OF THE DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and is therefore not to be considered limiting of its scope as the invention may admit to other equally effective embodiments.

FIG. 1 is a plan view of a disk drive constructed in accordance with the invention.

FIG. 2 is an enlarged plan view of the disk drive of FIG. 1 showing the actuator in a first pumping position.

FIG. 3 is an enlarged plan view of the disk drive of FIG. 1 showing the actuator in a second pumping position.

DETAILED DESCRIPTION OF THE PREFERRED EMBODIMENT

Referring to FIG. 1, a schematic drawing of one embodiment of an information storage system comprising a magnetic hard disk file or drive 11 for a computer system is shown. Drive 11 has a sealed outer housing or base 13 containing a plurality of stacked, parallel magnetic disks 15 (one shown) which are closely spaced apart. Disks 15 are rotated by a spindle motor located therebelow about a central drive hub 17. An actuator 21 comprises a plurality of stacked, parallel actuator arms 25 (one shown) in the form of a comb that is pivotally mounted to base 13 about a pivot assembly 23. A controller 19 is also mounted to base 13 for controlling the selective movement of the comb of arms 25 relative to disks 15, and for other operational functions of drive 11.

In the embodiment shown, each arm 25 has extending from it a pair of parallel, cantilevered load beams or suspensions 27, and at least one magnetic read/write transducer or head 29 mounted on a slider secured to a flexure that is flexibly mounted to each suspension 27. The read/write heads 29 magnetically read data from and/or magnetically write data to disks 15. The level of integration called head gimbal assembly is head 29 mounted on suspension 27. Suspensions 27 have a spring-like quality which biases or maintains them in parallel relationship relative to one another.

A voice coil motor 31 housed within a conventional voice coil motor magnet assembly (not shown) is also mounted to the arms 25 opposite head gimbal assemblies 29. Movement of an actuator driver 33 (indicated by arrow 35) moves head gimbal assemblies 29 radially across tracks on the disks 15 until the heads on assemblies 29 settle on the target tracks. A crash stop 37 limits the pivotal range of motion of head 29 on actuator 27 in the radially inward (toward hub 17) direction. The head gimbal assemblies 29 operate in a conventional manner and always move in unison with one another, unless drive 11 uses a split actuator (not shown) wherein the arms move independently of one another. Drive 11 is also equipped with a pump assembly 41 that will be described in further detail below.

Referring now to FIGS. 2 and 3, enlarged views of actuator 21 and pump assembly 41 are shown. In the embodiment shown, pump assembly 41 comprises a pump housing 43 having an internal chamber or cylinder 45 with a sealed backstop 47 on one end (right side of FIGS. 2 and 3). A fluid conduit 48 extends between pump assembly 41 and an exterior of drive 11 for releasing pressure to the ambient surroundings and for evacuating drive 11. A small piston 49 is located in cylinder 45 for reciprocal axial motion therein. A compression spring 51 is located between backstop 47 and piston 49 for biasing piston 49 away from backstop 47 (to the left in FIGS. 2 and 3). In this version, a short piston rod 53 extends from piston 49 opposite spring 51. Piston rod 53 passes through a small hole in housing 43 to an exterior thereof adjacent to voice coil motor 31 of actuator 21.

In operation, pump assembly 41 is used to partially evacuate the interior atmosphere of sealed drive 11 in order to lower its operating pressure. Pump assembly 41 is activated by the simple oscillatory pivot motion of actuator 21, rather than by a dedicated motor as is required in the prior art. When actuator 21 rotates in a counterclockwise direction (FIG. 2), voice coil motor 31 moves toward crash stop 37 and away from pump assembly 41. In this way, voice coil motor 31 releases piston rod 53, thereby allowing piston 49 to move the left via expanding spring 51.

When actuator 21 rotates back in the clockwise direction (FIG. 3), voice coil motor 31 moves toward pump assembly 41 to push piston rod 53 and piston 49 to the right and compress spring 51. Such motion lowers the pressure of drive 11 incrementally via conduit 48. When this process is repeated by oscillating actuator 25 between the two positions of FIGS. 2 and 3, drive 11 is partially evacuated to lower the operating pressure thereof. This process may be employed as necessary to maintain an adequate operating environment. Ideally, this process is used at start-up of drive 11.

Drive 11 is also provided with a pressure sensor 55 (FIG. 1) that is monitored by controller 19. When the pressure in drive 11 is below a threshold operating requirement, the pressure-reducing sequence can be initiated to lower the operating pressure of drive 11 to an acceptable level. Alternatively, pump assembly 41 may be activated at regular intervals, such as once per day or once per week, to maintain a proper operating pressure in drive 11. Note that the illustrative pivotal range of motion of actuator 21 in the clockwise direction of FIG. 3, for example, may be greater than that shown in order to perform its normal reading and writing functions. In one version, when actuator 21 is rotated in the counterclockwise direction (FIG. 2), voice coil motor 31 may not always be in physical contact with piston rod 53, which then remains in the extended position due to the bias of spring 51.

The present invention has several advantages over other prior art configurations. Disk drive assemblies that are equipped to generate pumping action via their voice coil motor are able to reduce the number of parts and the cost required to accomplish the same objective in the prior art. The present design also offers an increase in both power and pumping rate over other designs. Moreover, the necessary reduction in pressure can be achieved while the drive is accelerating up to its operational speed. As a result, the read/write heads are able to immediately perform their functions when loaded onto a disk. In addition, the power required for the pumping action is reduced very quickly, and the increased pump rate can have a less negative effect on acoustics.

While the invention has been shown or described in only some of its forms, it should be apparent to those skilled in the art that it is not so limited, but is susceptible to various changes without departing from the scope of the invention.

What is claimed is:

1. A disk drive assembly, comprising:
   a base containing a data storage disk that is rotatably mounted to a motor,
   an actuator movably mounted to the base and having a transducer for reading data from and writing data to the disk;
   a controller for controlling operations of the disk drive assembly; and
   a pump assembly located inside the base adjacent to the actuator such that the pump assembly is activated by motion of the actuator; and wherein the pump assembly comprises a pump housing having a piston that is moved by the actuator for communicating pressure to ambient surroundings.

2. A disk drive assembly, comprising:

a sealed base containing data storage disks that are rotatably mounted to a motor;

an actuator movably mounted to the base and having transducers for reading data from and writing data to the disks;

a controller for controlling operations of the disk drive assembly;

a pressure sensor monitored by the controller and wherein the operating pressure of the base is maintained in response thereto;

a pump assembly located inside the base and biased toward the actuator, the pump assembly having a chamber with a piston, wherein the piston is reciprocated in the chamber by oscillatory pivot motion of the actuator to partially evacuate an interior atmosphere of the base and lower an operating pressure thereof;

a crash stop adjacent to the actuator for limiting the range of motion of the actuator relative to the pump assembly; and wherein the actuator has a voice coil motor that physically contacts the piston to provide activation thereof.

3. A disk drive assembly, comprising:

a base containing a data storage disk that is rotatably mounted to a motor;

an actuator moveably mounted to the base and having a transducer for reading data from and writing data to the disk;

a controller for controlling operations of the disk drive assembly; and a pump assembly located inside the base adjacent to the actuator such that the pump assembly is activated by motion of the actuator; and wherein the pump assembly is biased in one direction by a spring.

4. The disk drive assembly of claim 3 wherein the actuator has a voice coil motor that physically contacts the pump assembly to provide activation thereof.

5. The disk drive assembly of claim 3, further comprising a crash stop adjacent to the actuator for limiting the range of motion of the actuator relative to the pump assembly.

6. The disk drive assembly of claim 3 wherein the pump assembly partially evacuates an interior atmosphere of the base to lower an operating pressure thereof.

7. The disk drive assembly of claim 3 wherein the pump assembly is activated by oscillatory pivot motion of the actuator.

8. The disk drive assembly of claim 3, further comprising a pressure sensor monitored by the controller and wherein an internal pressure of the base is maintained in response thereto.

9. The disk drive assembly of claim 6 wherein the pump assembly is actuated while the data storage disk is accelerating to an operational speed.

10. A disk drive assembly, comprising:

a sealed base containing data storage disks that are rotatably mounted to a motor;

an actuator movably mounted to the base and having transducers for reading data from and writing data to the disks;

a controller for controlling operations of the disk drive assembly; and a pump assembly located inside the base and having a chamber with a piston, wherein the piston is reciprocated in the chamber by oscillatory pivot motion of the actuator to partially evacuate an interior atmosphere of the base and lower an operating pressure thereof.

11. The disk drive assembly of claim 10 wherein the pump assembly is biased toward the actuator by a spring.

12. The disk drive assembly of claim 10 wherein the actuator has a voice coil motor that physically contacts the piston to provide activation thereof.

13. The disk drive assembly of claim 10, further comprising a crash stop adjacent to the actuator for limiting the range of motion of the actuator relative to the pump assembly.

14. The disk drive assembly of claim 10, further comprising a pressure sensor monitored byte controller and wherein the operating pressure of the base is maintained in response thereto.

15. The disk drive assembly of claim 10 wherein the pump assembly is actuated while the data storage disk is accelerating to an operational speed.

* * * * *

UNITED STATES PATENT AND TRADEMARK OFFICE
CERTIFICATE OF CORRECTION

PATENT NO.    : 6,618,221 B2
DATED         : September 9, 2003
INVENTOR(S)   : Donald Ray Gillis et al.

It is certified that error appears in the above-identified patent and that said Letters Patent is hereby corrected as shown below:

<u>Column 6,</u>
Line 37, please remove the word "byte" and insert the words -- by the --.

Signed and Sealed this

Thirtieth Day of December, 2003

JAMES E. ROGAN
*Director of the United States Patent and Trademark Office*